(12) United States Patent
Chan et al.

(10) Patent No.: US 6,965,734 B2
(45) Date of Patent: Nov. 15, 2005

(54) ELECTRONIC EQUIPMENT AND CAMERA

(75) Inventors: Raymond Chan, Hong Kong (CN); Yiu Hung Li, Hong Kong (CN); Nobuaki Higashi, Tokyo (JP); Mikihiko Kato, Tokyo (JP)

(73) Assignees: IDT Data System Limited, Hong Kong (CN); Fuji Film Axia Co., Ltd., Tokyo (JP); Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/829,151

(22) Filed: Apr. 22, 2004

(65) Prior Publication Data

US 2004/0264953 A1 Dec. 30, 2004

(30) Foreign Application Priority Data

Apr. 25, 2003 (JP) .......................................... 2003-121784

(51) Int. Cl.[7] .......................... G03B 13/00; G03B 17/04; G05G 1/10
(52) U.S. Cl. ........................ 396/144; 396/147; 396/299; 396/349; 348/345; 348/376; 74/553
(58) Field of Search ................................ 396/72–74, 144, 396/147, 297–299, 349; 348/345, 373–376; 74/552, 553, 557

(56) References Cited

U.S. PATENT DOCUMENTS

| | | | | | |
|---|---|---|---|---|---|
| 304,401 | A | * | 9/1884 | Barnes et al. | 114/160 |
| 2,155,101 | A | * | 4/1939 | Schnell | 116/256 |
| 3,393,622 | A | * | 7/1968 | Schottle et al. | 396/147 |
| 4,163,613 | A | * | 8/1979 | Smart | 396/144 |
| 4,363,546 | A | * | 12/1982 | Enomoto et al. | 396/144 |
| 4,674,854 | A | * | 6/1987 | Kawamura et al. | 396/299 |
| 6,070,020 | A | | 5/2000 | Misawa | 396/299 |
| 6,643,457 | B2 | * | 11/2003 | Chen | 396/74 |

FOREIGN PATENT DOCUMENTS

| | | | | |
|---|---|---|---|---|
| JP | 9-50076 A | 2/1997 | ........... | G03B/17/02 |
| JP | 11-305307 A | 11/1999 | ........... | G03B/17/02 |
| JP | 2001-42401 A | 2/2001 | ........... | G03B/17/02 |

* cited by examiner

*Primary Examiner*—W. B. Perkey
(74) *Attorney, Agent, or Firm*—Birch, Stewart, Kolasch & Birch, LLP

(57) ABSTRACT

Pawls are formed on an outer peripheral portion of an operation dial at intervals equal to step rotating angles of the operation dial so that a user's finger nail can be placed on one of the pawls to rotate the dial. When the finger nail is placed on one of the pawls to rotate the operation dial, the finger nail placed on that pawl abuts against a stopper provided on a camera main body. Thus, rotation of the operation dial is stopped at each step rotating angle.

8 Claims, 10 Drawing Sheets

ELECTRONIC EQUIPMENT AND CAMERA

This Nonprovisional application claims priority under 35 U.S.C. § 119(a) on Patent Application No. 2003-121784 filed in JAPAN on Apr. 25, 2003, the entire contents of which are hereby incorporated by reference.

BACKGROUND OF THE INVENTION

1. Field of the Invention

The present invention relates to electronic equipment and a camera comprising an operation dial, and in particular, to electronic equipment and a camera which comprise a rotatively operated operation dial.

2. Description of the Related Art

Electronic equipment such as cameras and cellular phones is too small to be provided with a large number of operation buttons. Accordingly, many pieces of such electronic equipment use a rotary operation dial (refer to, for example, Japanese Patent Application Publication No. 2001-42401, Japanese Patent Application Publication No. 11-305307, or Japanese Patent Application Publication No. 9-50076).

The operation dial of this kind has a large number of grooves formed in its outer peripheral portion so as to be easily rotated by the finger. The operation dial is also provided with what is called a click stop mechanism so that its rotation can be stopped at predetermined operation intervals.

However, with conventional cameras or equipment comprising such an operation dial, even with the click stop mechanism, the operation dial may be excessively rotated depending on the force exerted on the dial.

SUMMARY OF THE INVENTION

The present invention is provided in view of these circumstances. It is an object of the present invention to provide equipment and a camera which comprise an operation dial that ensures that its own rotation can be stopped at desired positions.

To accomplish this object, a first aspect of the present invention provides electronic equipment comprising an electronic equipment main body and an operation dial rotatably provided in the electronic equipment main body and rotatively operated through preset step rotating angles, the operation dial having a plurality of protruding portions which are formed on an outer peripheral portion at intervals equal to the step rotating angles and on which a finger nail is placed to rotate the operation dial, wherein the electronic equipment main body is formed with a rotation regulating portion against which, when the finger nail is placed on one of the protruding portion to rotate the operation dial through the corresponding step rotating angle, the finger nail placed on the protruding portion abuts at a predetermined position to regulate rotation of the operation dial.

According to the first aspect of the present invention, when the finger nail is placed on one of the protruding portions, formed on the outer peripheral portion of the operation dial, to rotate the operation dial, the finger nail abuts, at the predetermined position, against the rotation regulating portion, provided in the electronic equipment main body. This ensures that the rotation of the operation dial can be stopped at each preset step rotating angle.

In the first aspect of the present invention, the electronic equipment main body may be formed with an arc portion along an outer periphery of the operation dial. A slit may be formed in the arc portion. Only the protruding portions may be protruded from the slit. The rotation regulating portion may be formed on the arc portion as a convex portion extending orthogonally to the slit.

According to this aspect, the slit is formed in the arc portion, formed in the device main body. The protruding portions, formed on the operation dial, protrude from the slit. If the operation dial is rotatively operated, the finger nail is placed on one of the protruding portions protruding from the slit and is rotated so as to trace the arc portion. This enables the operation dial to be smoothly rotated.

In the first aspect of the present invention, the electronic equipment main body may have a window portion formed opposite an end surface of the operation dial. The end surface of the operation dial may be provided with indications of characters or pictographs for functions executed when the rotation of the operation dial is stopped, the indications being provided for the respective step rotating angles, so that when the rotation of the operation dial is stopped, one of the indications appears in the window portion.

According to this aspect, when the rotation of the operation dial is stopped, the indication of the corresponding function to be executed appears in the window portion, formed in the device main body, as a character or a pictograph. Thereby, the function performed when the rotation of the operation dial is stopped can be seen at a glance.

Furthermore, to accomplish the above object, a second aspect of the present invention provides a camera comprising a camera main body, a lens barrel provided in the camera main body, a driving member that is rotatively operated to drivingly extend the lens barrel, and an operation dial which rotatively operates the driving member and which is provided integrally with the driving member so as to be rotatable through preset step rotating angles with respect to the camera main body, the operation dial having a plurality of protruding portions which are formed on an outer peripheral portion of the operation dial at intervals equal to the step rotating angles and on which a finger nail is placed to rotate the operation dial, wherein the camera main body is formed with a rotation regulating portion against which, when the finger nail is placed on one of the protruding portion to rotate the operation dial through the corresponding step rotating angle, the finger nail placed on the protruding portion abuts at a predetermined position to regulate rotation of the operation dial, and the operation dial is rotated through one of the step rotating angles to rotatively operate the driving member to extend the lens barrel in accordance with the step rotating angle.

According to the second aspect of the present invention, the operation dial is rotated through the step rotating angles to extend the lens barrel step by step. In this case, when the finger nail is placed on one of the protruding portions, formed on the outer peripheral portion of the operation dial, to rotate the operation dial, the finger nail abuts, at the predetermined position, against the rotation regulating portion, provided in the electronic equipment main body. This ensures that the rotation of the operation dial can be stopped at each preset step rotating angle.

In the second aspect of the present invention, the camera main body may be formed with an arc portion along an outer periphery of the operation dial. A slit may be formed in the arc portion. Only the protruding portions may be protruded from the slit. The rotation regulating portion may be formed on the arc portion as a convex portion extending orthogonally to the slit.

According to the second aspect of the present invention, the electronic equipment main body may have a window portion formed at a position opposite to an end surface of the operation dial. The end surface of the operation dial may be provided with indications of characters or pictographs for functions executed when the rotation of the operation dial is stopped, the indications being provided for the respective step rotating angles, so that when the rotation of the operation dial is stopped, one of the indications appears in the window portion.

As described above, with the electronic equipment and camera according to the present invention, the rotation of the operation dial can be reliably stopped at the desired positions through the action of the protruding portions, formed on the outer peripheral portion of the operation dial, and of the rotation regulating portion, provided in the electronic equipment or camera main body.

DETAILED DESCRIPTION OF THE PREFERRED EMBODIMENTS

With reference to the drawings, a detailed description will be given of a preferred embodiment of electronic equipment and a camera according to the present invention.

Figure 1:
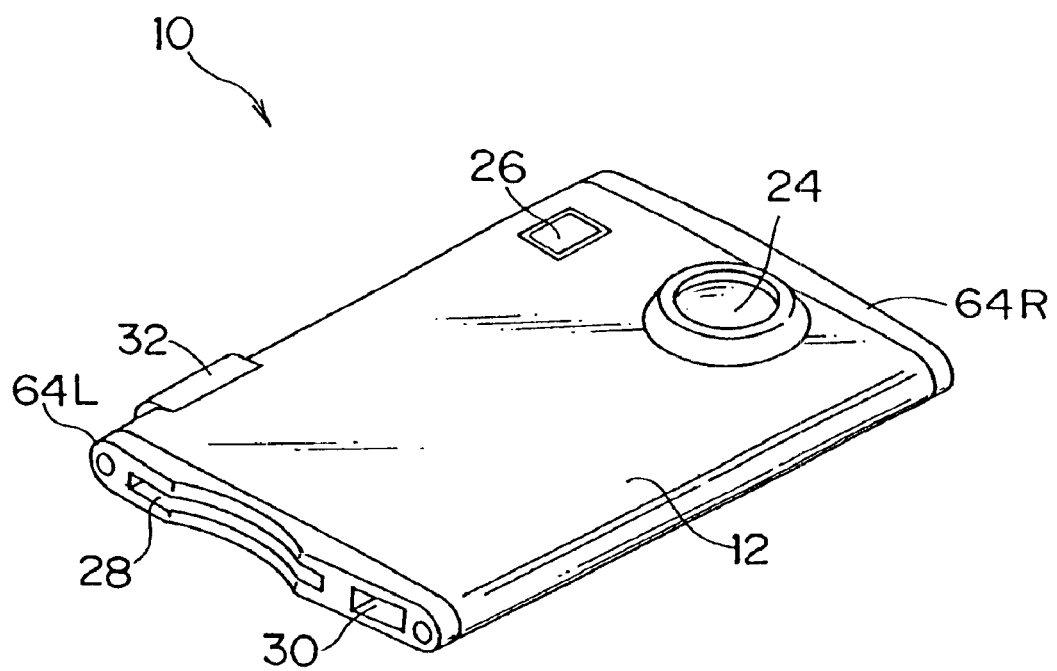
FIG. 1 is a front perspective view of a digital camera into which a collapsible lens barrel according to the present invention is incorporated.
Figure 2:
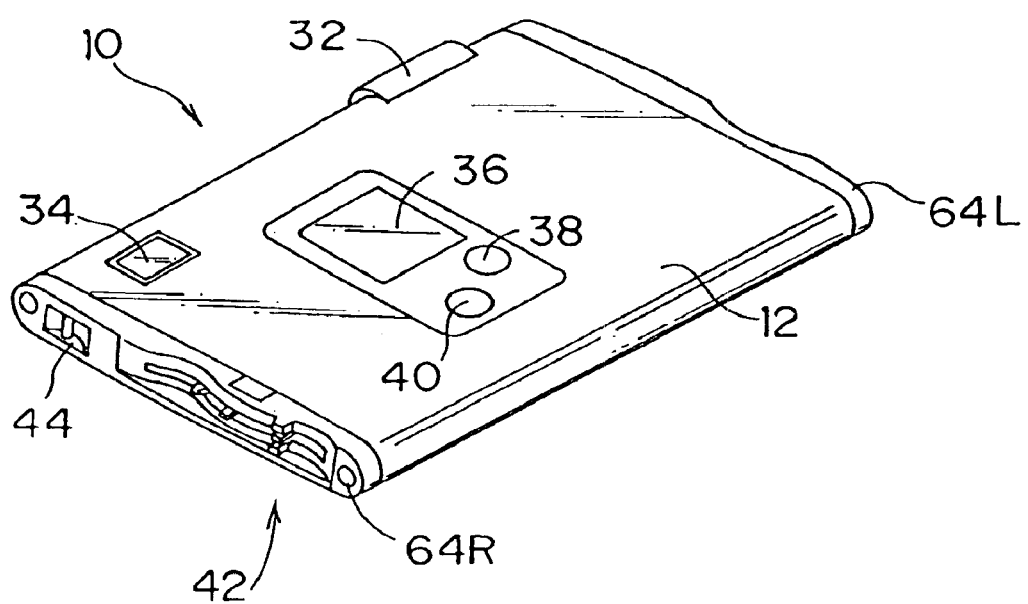
FIG. 2 is rear perspective view of the digital camera into which the collapsible lens barrel according to the present invention is incorporated.

FIGS. 1 and 2 are a front and rear perspective views of a digital cameral 10 according to the present invention.

As shown in these figures, a digital camera 10 is of a card type having only a shooting function. A camera main body 12 is dimensioned like a business card and has a thickness of about 8 mm.

Figure 3A:
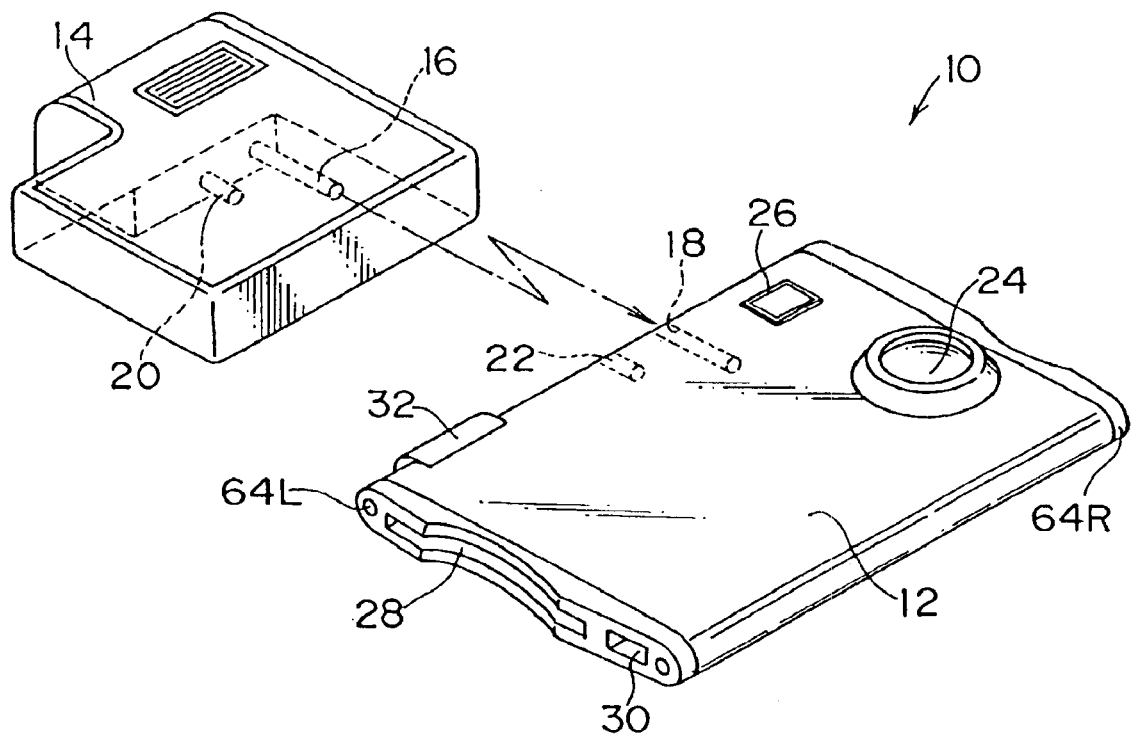
FIGS. 3A and 3B are front perspective view showing how an electronic flash device is installed in a camera main body.
Figure 3B:
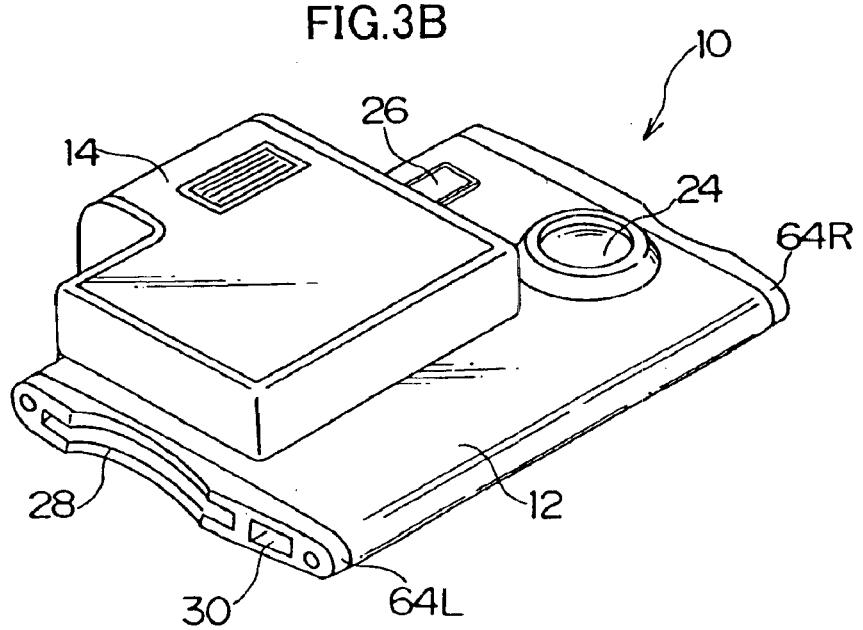

An external electronic flash device 14 can be installed on a camera main body 12 as shown in FIGS. 3A and 3B. The external electronic flash device 14 is fixed to the camera main body 12 by inserting its plug 16 into a jack 18 formed in a top surface of the camera main body 12 and screwing an electronic flash device fixing screw 20 into a threaded hole 22 formed in the top surface of the camera main body 12.

A photographing lens 24 and a finder window 26 are provided on a front surface of the camera main body 12 as shown in FIG. 1.

The photographing lens 24 comprises a collapsible single-focus lens. The photographing lens 24 is extended from a "collapsed position" through a "shooting position" to a "macro shooting position" in unison with a rotating operation of a wheel 54 constituting a power switch 42, described later.

A finder comprises an inverted Galilean finder having an objective that is a concave lens and an ocular that is a convex lens. The objective is located under a finder window 26.

A card slot 28 and a USB terminal 30 are provided on a left side (in the left of FIG. 1) of the camera main body 12.

A memory card is removably installed in the card slot 28. A captured image is recorded in a memory card installed in the card slot 28. The digital camera 10 also has a built-in memory. If no memory card is installed in the card slot 18, images are recorded in the built-in memory.

A USB cable is connected to the USB terminal 30 so that image data recorded in the memory card or built-in memory can be loaded into a personal computer or the like via the USB cable.

As shown in FIGS. 1 and 2, a release button 32 is provided on the top surface of the camera main body 12. Pushing the release button 32 allows an image to be recorded in the built-in memory or memory card.

As shown in FIG. 2, a finder ocular portion 34, a liquid crystal display portion 36, an image quality switch/image deletion button 38, and a beep ON/OFF button 40 are provided on a rear surface of the camera main body 12.

An ocular constituting the finder is located in the finder ocular portion 34. A finder image is observed via the finder ocular portion 34. The liquid crystal portion 36 comprises monochromatic character liquid crystal to indicate, in characters or pictographs, the remaining number of images that can be taken, capturing image quality, the quantity of charges in batteries, the presence or absence of a beep, and the like. The image quality switch/image deletion button 38 functions to instruct on the switching of capturing image quality and the deletion of a captured image. The beep ON/OFF button 40 functions to instruct a beep to be turned on or off.

An operation dial 42 also used as a power switch and a strap attaching portion 44 are provided on a right side (in the left of FIG. 2) of the camera main body 12.

The operation dial 42 comprises a ring like wheel 54 and is rotatively operated through predetermined step rotating angles between an "OFF position" and an "ON position" and a "macro position" as described later. The digital camera 10 is powered off by placing the operation dial 42 in the "OFF position". The digital camera 10 is powered on by placing the operation dial 42 in the "ON position". Then, by rotating the operation dial 42 from the "OFF position" to the "ON position", a movable cylinder 56 holding the photographing lens 24 is extended from the "collapsed position" to the "shooting position" by rotating it from the "ON position" to the "macro position", it is extended to the macro shooting position. Then, once the movable cylinder 56 holding the photographing lens 24 is placed in the "shooting position", normal shooting is enabled. Placing the movable cylinder 56 in the "macro position" enables macro shooting.

Figure 4:
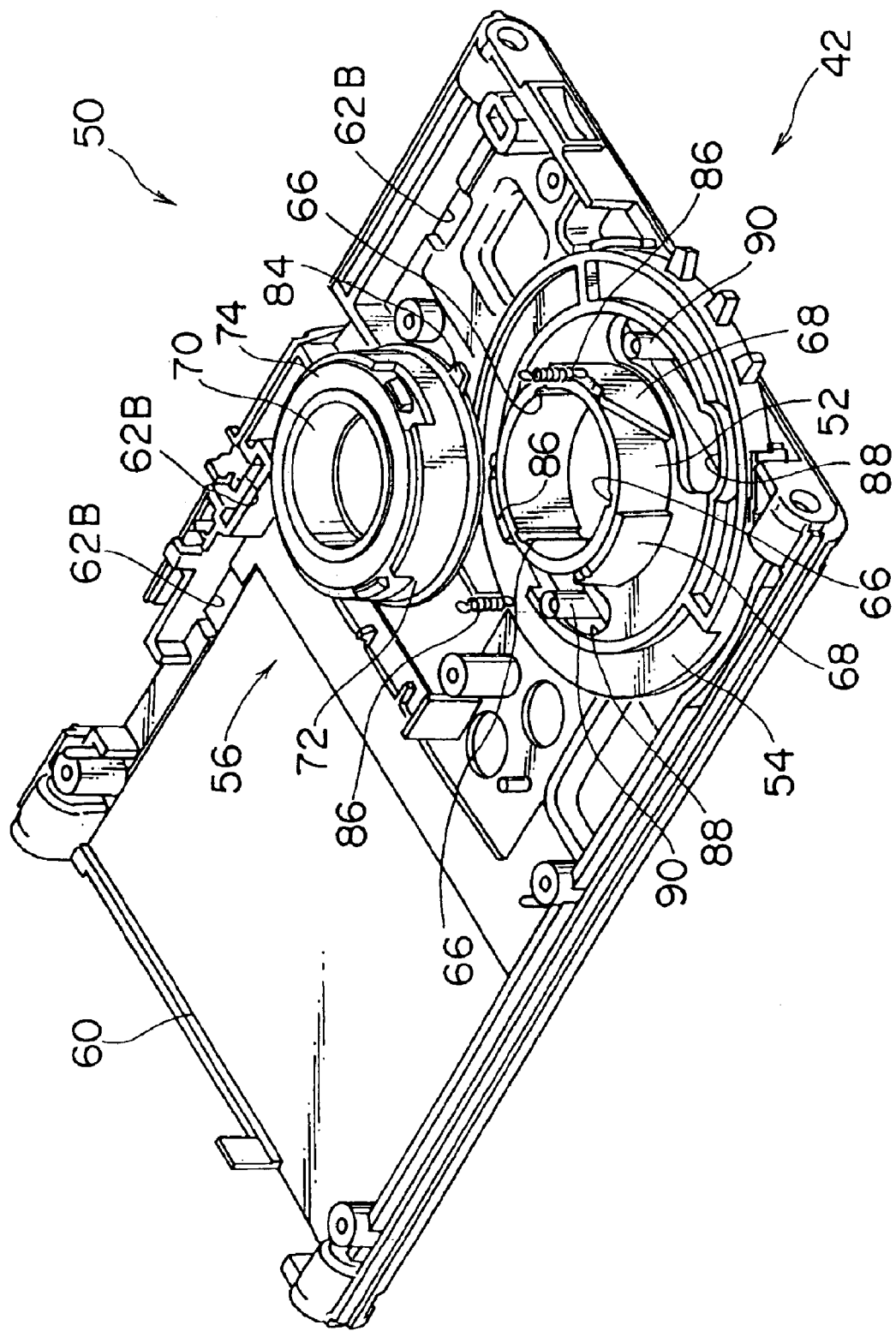
FIG. 4 is an exploded perspective view showing the configuration of a lens barrel of a photographing lens.

FIG. 4 is an exploded perspective view showing the configuration of a lens barrel 50 of the photographing lens 24. As shown in this figure, the lens barrel 50 comprises a fixed cylinder 52, a wheel 54, and the movable cylinder 56.

Figure 5:
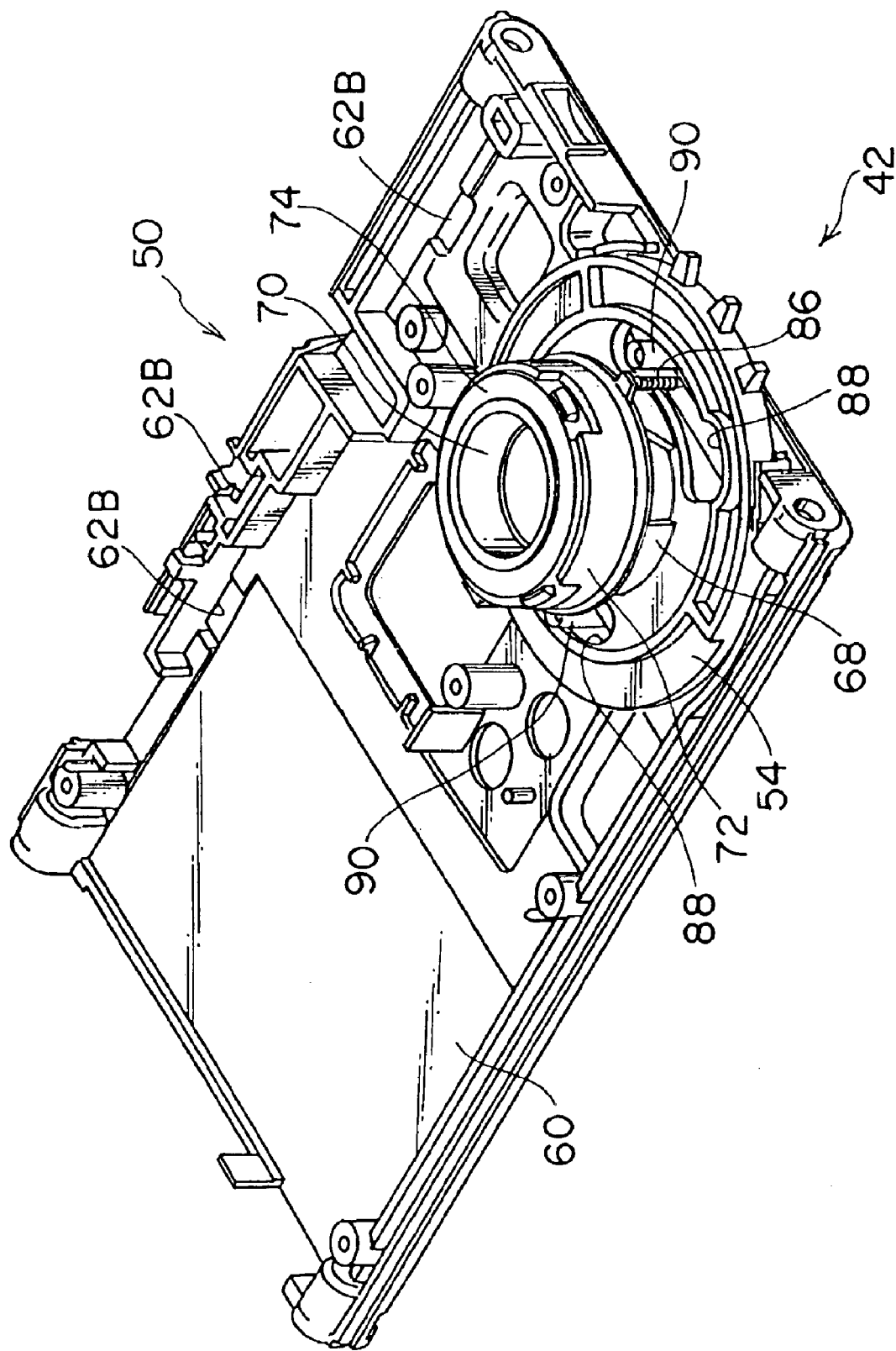
FIG. 5 is a perspective view showing the configuration of a rear frame.
Figure 6:
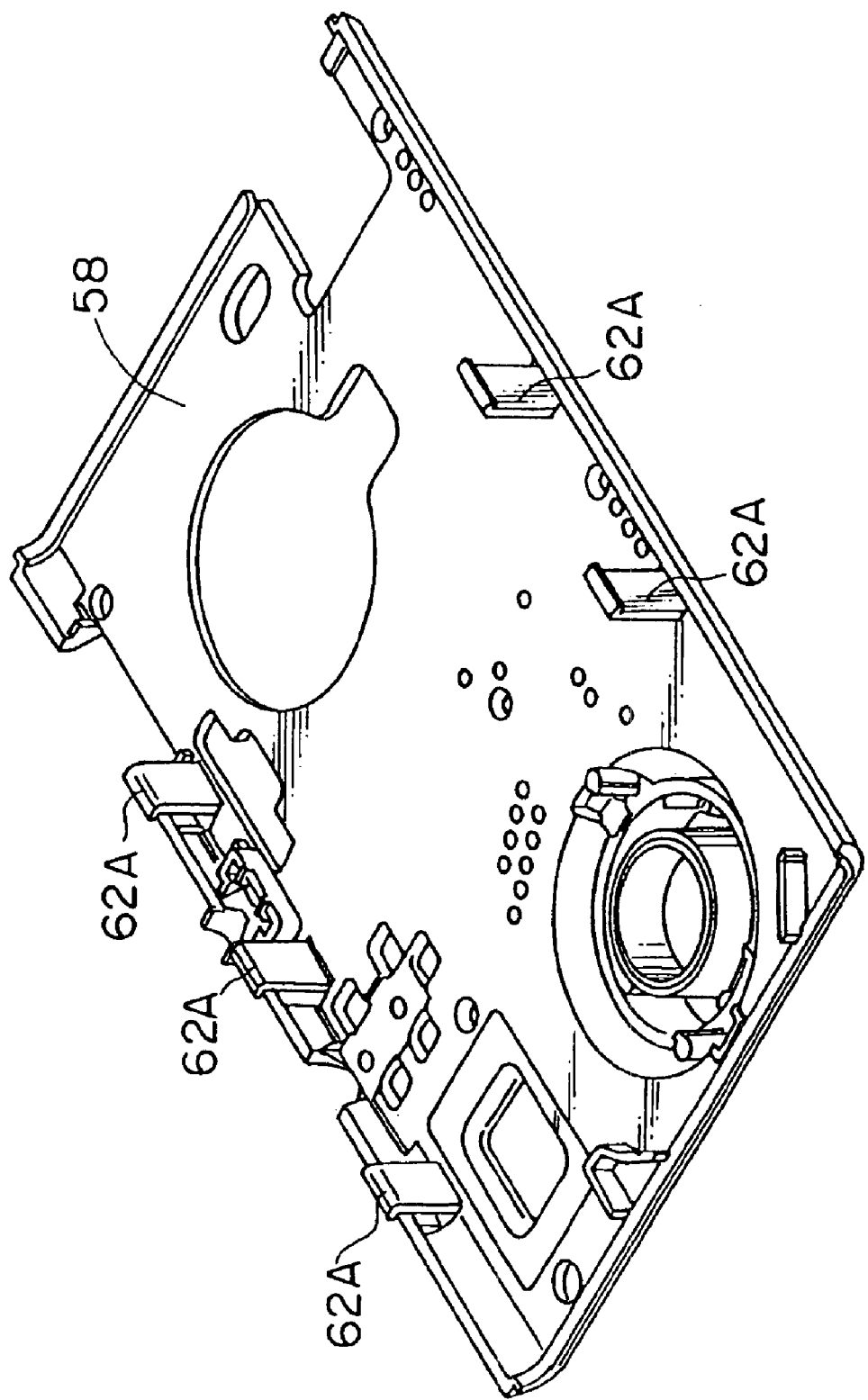
FIG. 6 is a perspective view showing the configuration of a front frame.

The fixed cylinder 52 is integrally provided in the camera main body 12. The camera main body 12 comprises a front frame 58 and a rear frame 60 as shown in FIGS. 5 and 6. The front frame 58 and the rear frame 60 are both molded of a plastic material in a bright color (for example, a bright gray). The front frame 58 and the rear frame 60 are integrated with each other by fitting engagement pawls 62A formed at three positions on an upper end portion and at two positions on a lower end portion of the front frame 58, into engagement slots 62B formed at the corresponding positions of the rear frame 60 (what is called a snap-in structure). In FIGS. 4 and 5, the engagement slots 62B (two positions) in the lower end portion of the rear frame 60 are omitted.

As shown in FIGS. 1 and 2, decorative plates 58A and 60A made of aluminum are attached to the front frame 58 and rear frame 60, respectively, which are integrated together. Side frames 64R and 64L made of plastics are attached to the respective ends of the front frame 58 and rear frame 60.

As shown in FIG. 4, the fixed cylinder 52 is provided on the rear frame 60, constituting the camera main body 12. The fixed cylinder 52 is molded integrally with the rear frame 60 via a pedestal portion (not shown). The fixed cylinder 52 is formed like a cylinder and has three linearly advancing guide grooves 66 formed in its inner peripheral portion at equal intervals along the optical axis.

The wheel 54 is made of black POM (polyacetal) and formed like ring. The wheel 54 is fitted around an outer peripheral portion of the fixed cylinder 52. When the operation dial 42 configured as described above is rotatively operated through the predetermined step rotating angle, the wheel 54 moves the movable cylinder 56 holding the photographing lens 24, between the "collapsed position" and the "shooting position" and the "macro shooting position". Three end surface cams 68 are disposed in an inner peripheral portion of the wheel 54 at equal intervals to drivingly extend the movable cylinder 56 holding the photographing lens 24.

Figure 7:
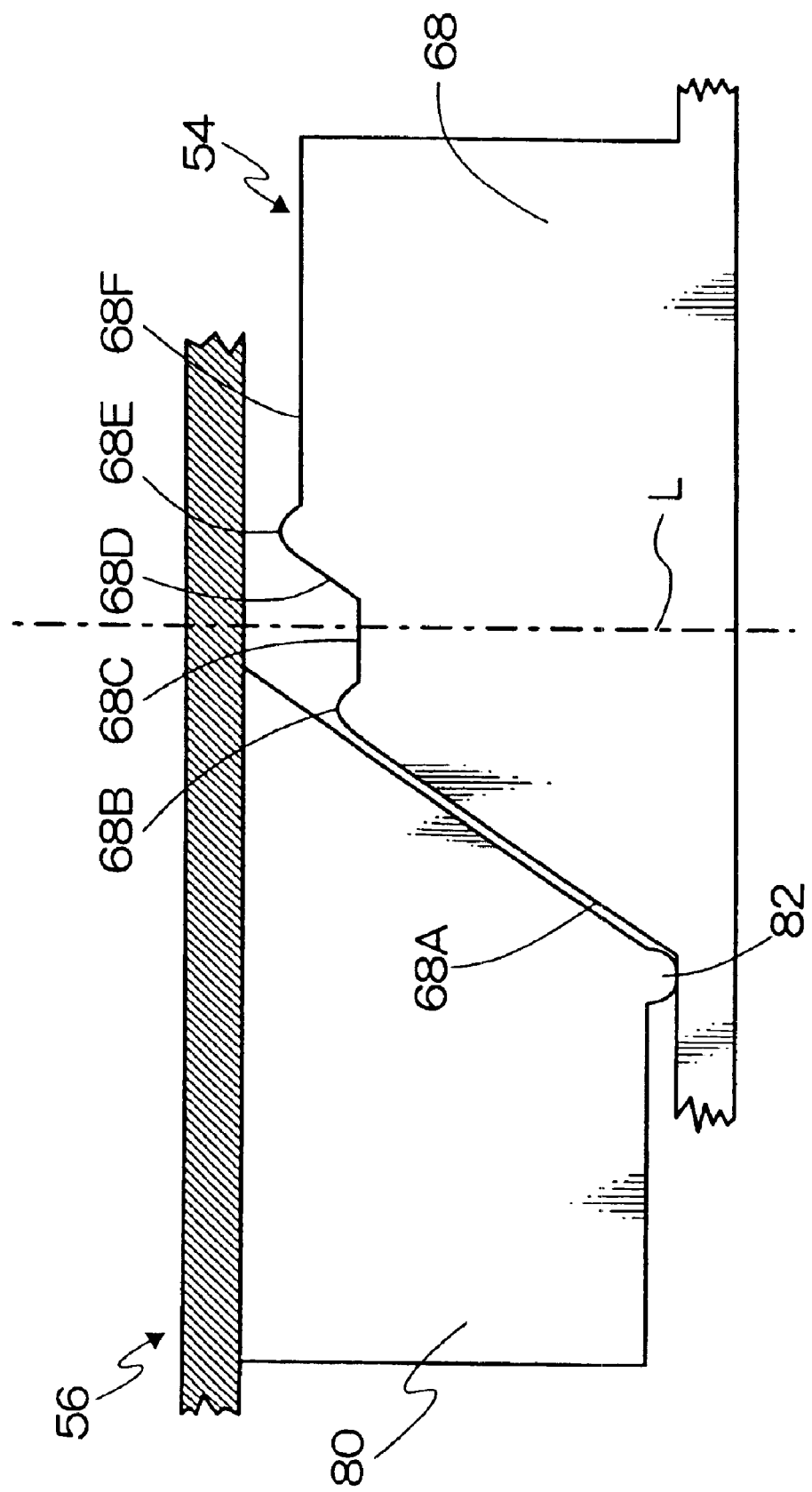
FIG. 7 is a development of an end surface cam.

The end surface cams 68 are formed like arcs along an outer peripheral surface of the fixed cylinder 52. FIG. 7 is a development of the end surface cam 68. As shown in this figure, the end surface cam 68 has a peripheral portion formed like steps; it comprises a first inclined portion 68A, a first flat portion 68C, a second inclined portion 68D, and a second flat portion 68F.

The first inclined portion 68A and the second inclined portion 68D are formed to be incline from the optical axis L through predetermined angles. The first flat portion 68C and the second flat portion 68F are formed to be orthogonal to the optical axis L.

Furthermore, a first protruding portion 68B is formed in the junction between the first inclined portion 68A and the first flat portion 68C. The first protruding portion 68B protrudes from the first flat portion 68C as a semispherical protrusion.

Likewise, a second protruding portion 68E is formed in the junction between the second inclined portion 68D and the second flat portion 68F. The second protruding portion 68E protrudes from the second flat portion 68F as a semispherical protrusion.

The movable cylinder 56 has a double cylinder structure in which an internal cylinder 70 and an external cylinder 72 are connected together via a tip end cap 74 and integrally formed in a black POM.

In the present invention, "tip end" is an object side end of an external cylinder and an internal cylinder, and "base end" is a camera body side end of an external cylinder and an internal cylinder.

Figure 8:
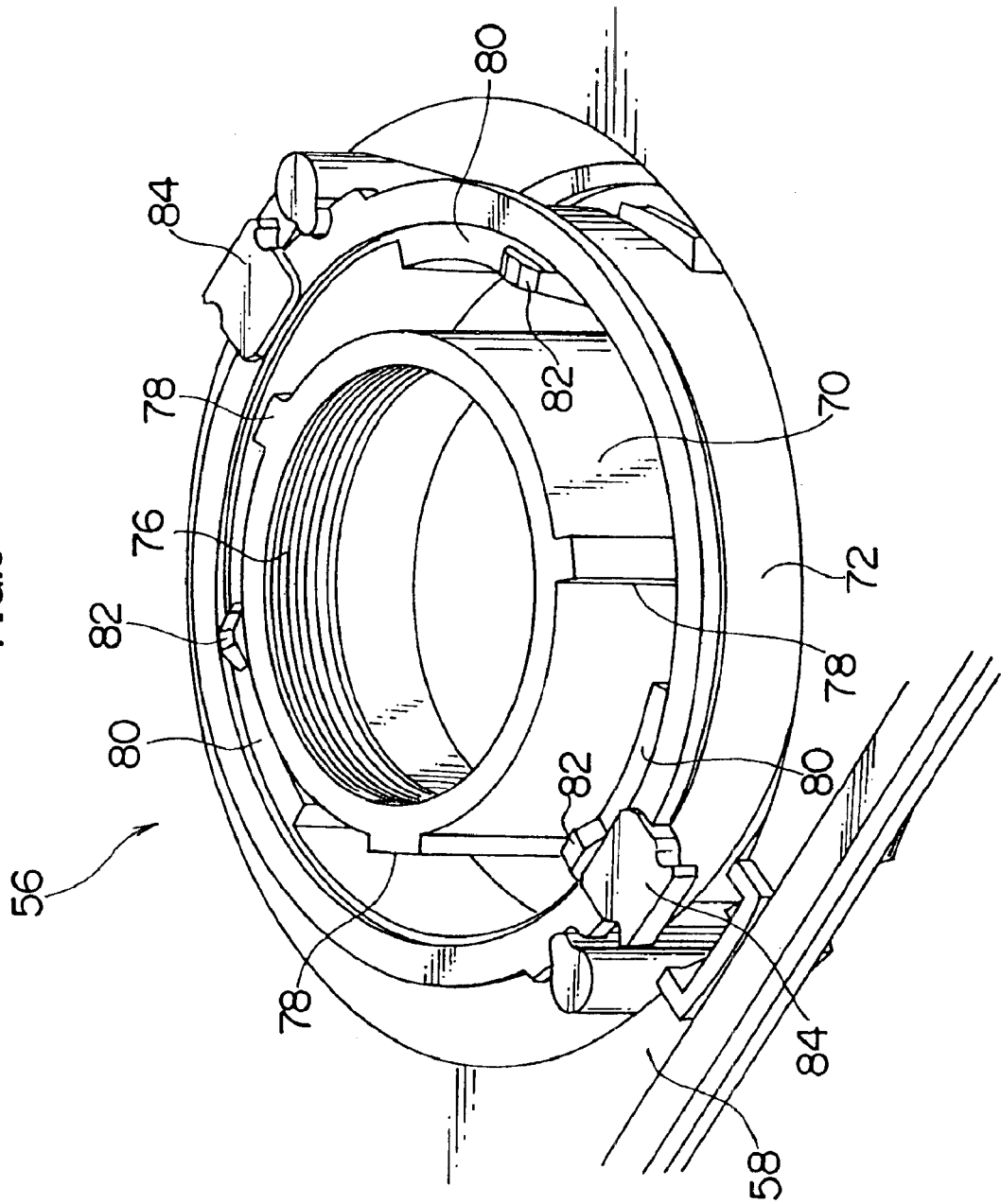
FIG. 8 is a perspective view showing the internal configuration of a movable cylinder.

The internal cylinder 70 is formed like a cylinder and is supported so as to be slidable along the inner peripheral portion of the fixed cylinder 52. The fixed cylinder 70 has the photographing lens 24 held on its inner peripheral portion and has a large number of shielding grooves 76 formed in its inner peripheral portion as shown in FIG. 8. Furthermore, three convex linearly advancing guide portions 78 are formed on an outer peripheral surface of the internal cylinder 70 at equal intervals so as to fit into the three linearly advancing guide grooves 66, formed in the inner peripheral surface of the fixed cylinder 52. The internal cylinder 70 moves linearly along the optical axis as the linearly advancing guide portions 78 slide along the respective linearly advancing guide groove 66.

On the other hand, the external cylinder 72 is formed like a cylinder and concentrically located around an outer peripheral portion of the internal cylinder 70. Three protruding portions 80 are formed on an inner peripheral portion of the external cylinder 72 at equal intervals as shown in FIG. 8. The protruding portions 80 are formed like inverse trapezoids extended from the inner peripheral surface of the external cylinder 72 as shown in FIG. 7. A semicircular cam follower 82 is integrally formed at one end of a lower side of each protruding portion 80. Furthermore, a pair of spring catching portions 84 is formed on the outer periphery of a base end portion of the external cylinder 72. A compression spring 86 is caught on each spring catching portion 84 so as to lie between the spring catching portion 84 and the rear frame 60 as described later.

Once the wheel 54 is installed in the fixed cylinder 52, the movable cylinder 56 is installed over the fixed cylinder 52 by fitting the internal cylinder 70 into the inner peripheral portion of the fixed cylinder 52. The cam followers 82 on the protruding portions 80, formed on the inner peripheral portion of the external cylinder 72 of the movable cylinder 56 installed over the fixed cylinder 52, abut the peripheries of the corresponding end surface cams 68, formed on the wheel 54. At this time, each cam follower 82 is formed like a semicircle, so it comes into point contact with the periphery of the corresponding end surface cam 68 for abutment.

One end of each compression spring 86 is caught on the corresponding spring catching portion 84 of the pair, formed on the outer peripheral portion of the base end portion of the external cylinder 72 of the movable cylinder 56 installed over the fixed cylinder 52. The other end of the compression spring 86 is caught on a spring catching portion (not shown) integrally formed on the rear frame 60. The movable cylinder 56 is always urged toward the rear frame 60 by the compression springs 86 set between the spring catching portions 84 and the rear frame 60. The movable cylinder 56 is urged toward the rear frame 60 to press and abut the cam followers 82 of the movable cylinder 56 against the peripheries of the corresponding end surface cams 68 of the wheel 54.

A pair of openings 88 formed like arcs are formed in the wheel 54. One end of each compression spring 86 is caught, through the corresponding opening 88, on the corresponding spring catching portion formed on the rear frame 60.

A strut 90 standing perpendicularly to the rear frame 60 is inserted through each opening 88 in the wheel 54. The struts 90 restrict the rotative movement range of the wheel 54. Specifically, when the wheel 54 is rotated in one direction, one end of each opening 88 abuts against the corresponding strut 90 at a predetermined position to stop the rotation. Likewise, when the wheel 54 is rotated in the other direction, the other end of the opening 88 abuts against the corresponding strut 90 at a predetermined position to stop the rotation. This serves to support the wheel 54 so that it can be rotatively moved only within a specific range.

Figure 9:
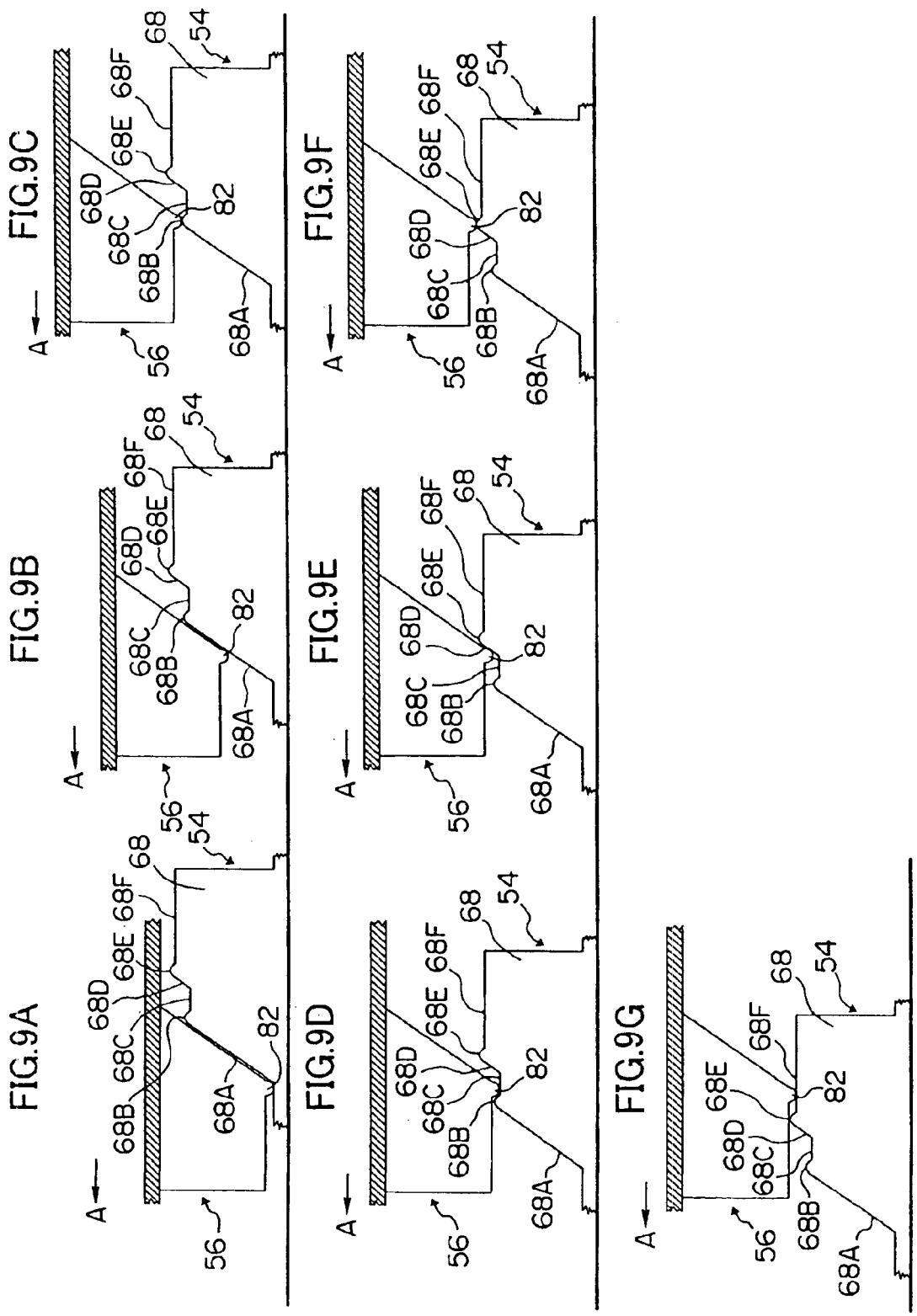
FIGS. 9A to 9G are diagrams illustrating a moving action of the movable cylinder.

When the wheel 54 is rotated, the movable cylinder 56 installed over the fixed cylinder 52 as described above is moved forward or backward along the optical axis through the action of the end surface cams 68 on the cam followers 82, provided on the wheel 54. The moving action of the movable cylinder will be described below with reference to FIG. 9.

FIG. 9A shows the movable cylinder 56 being collapsed. In this state, a tip end portion of the movable 56 is flush with a front surface of the camera main body 12. Furthermore, in this state, each of the cam followers 82 of the movable cylinder 56 abuts against a lower end portion of the first inclined portion 68A of the corresponding one of the end surface cams 68, provided on the wheel 54.

When the movable cylinder 56 located in the collapsed position is rotated by the wheel 54 in a direction shown by arrow A, the cam follower 82 is pushed by the first inclined surface 68A of the end surface cam 68 to extend the movable cylinder 56 along the optical axis, as shown in FIG. 9B.

The wheel 54 continues to be rotated. Then, as shown in FIG. 9C, once the wheel 54 is placed in a predetermined rotational angle position, the cam follower 82 reaches the first protruding portion 68B. Then, when the wheel 54 is further rotated, the cam follower 82 climbs over the first protruding portion 68B to reach the first flat portion 68C as shown in FIG. 9D. Once the cam follower 82 reaches the first flat portion 68C, the movable cylinder 56 is placed in the shooting position. Then, in this position, when the rotation of the wheel 54 is stopped, the movable cylinder 56 is held in the shooting position.

After the movable cylinder 56 has been placed in the shooting position, the wheel 54 is rotated in the direction of arrow A. Then, when the wheel 54 is placed in a predetermined rotational angle position, the cam follower 82 abuts against a lower end portion of the second inclined portion 68D of the end surface cam 68. Then, when the wheel 54 is further rotated, the cam follower 82 is pushed by the second inclined surface 68D to extend the movable cylinder 56 along the optical axis, as shown in FIG. 9E. The wheel 54 continues to be further rotated. Then, as shown in FIG. 9F, once the wheel 54 is placed in a predetermined rotational angle position, the cam follower 82 reaches the second protruding portion 68E. Then, when the wheel 54 is further rotated, the cam follower 82 climbs over the second protruding portion 68E to reach the second flat portion 68F as shown in FIG. 9G. Once the cam follower 82 reaches the second flat portion 68F, the movable cylinder 56 is placed in the macro shooting position. Then, in this position, when the rotation of the wheel 54 is stopped, the movable cylinder 56 is held in the macro shooting position.

When the wheel 54 is thus rotated through the predetermined step rotating angles, the movable cylinder 56 holding the photographing lens 24 is extended step by step from the "collapsed position" through the "shooting position" to the "macro shooting position". Then, the reverse operation is performed to collapse the movable cylinder 56 extended to the "macro shooting position" to the "shooting position" and then to the "collapsed position".

The wheel 54, which drivingly extends the movable cylinder 56 as described above, is installed so as to be partly exposed from the right side of the camera main body 12. The user uses his or her finger to rotate the exposed part and thus the wheel 54.

Figure 10:
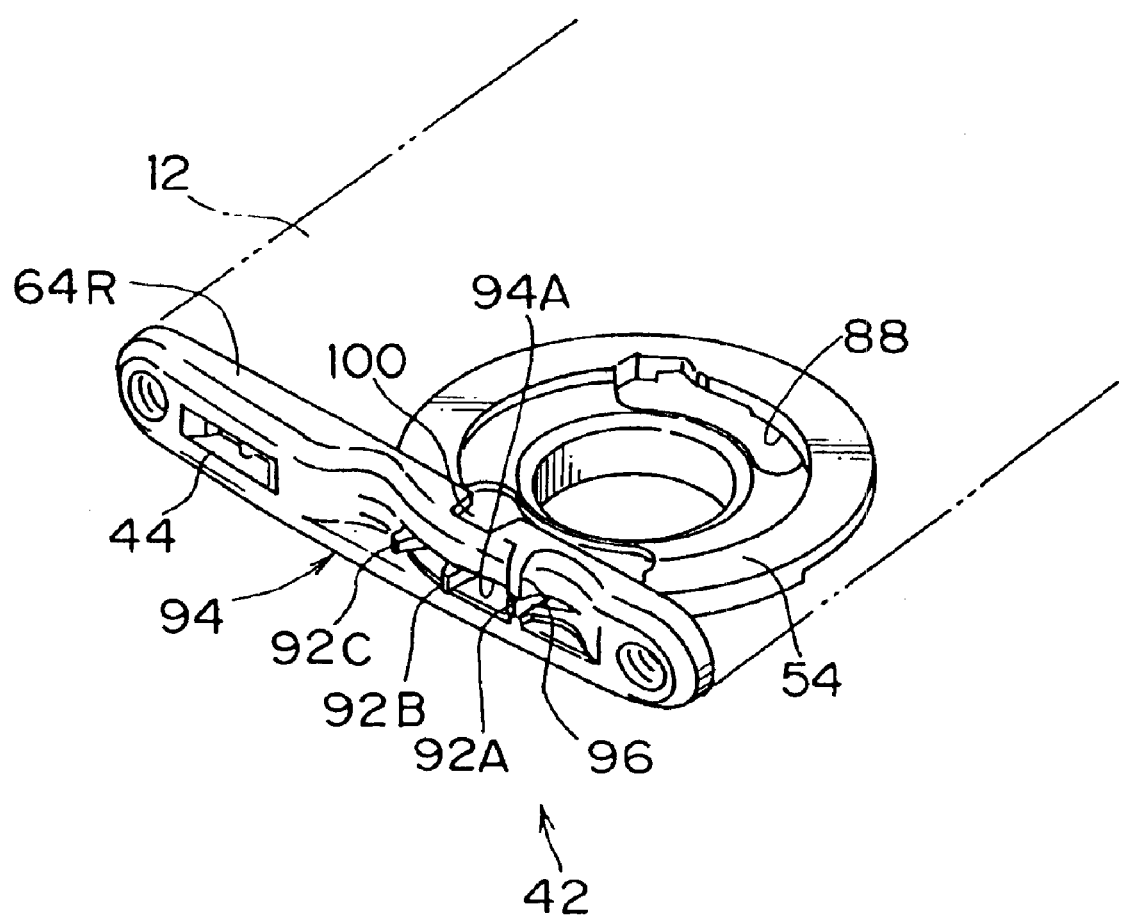
FIG. 10 is a perspective view showing the configuration of an operation dial.
Figure 11:
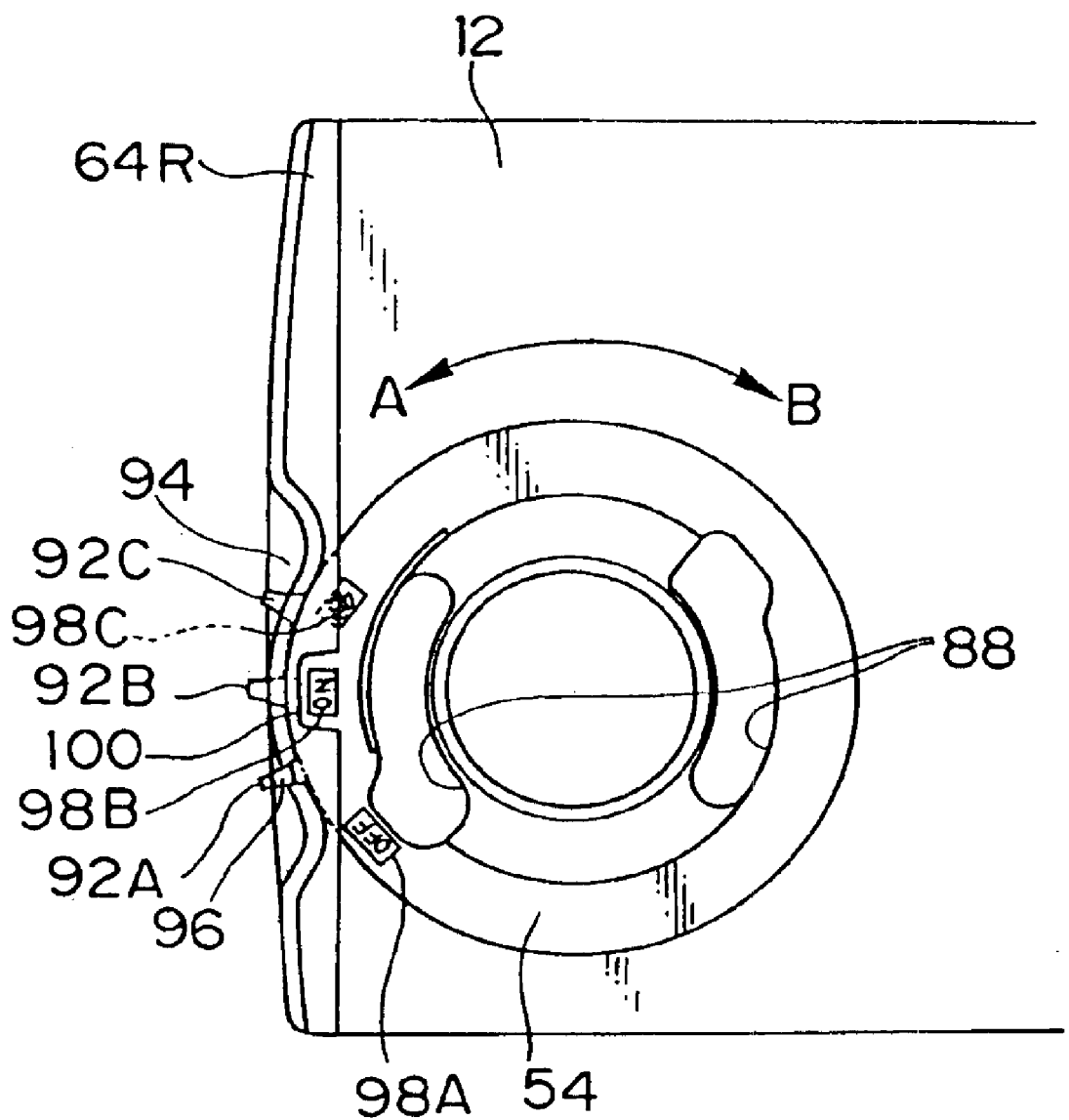
FIG. 11 is a plan view showing the configuration of an operation dial.

FIGS. 10 and 11 are an enlarged perspective view and an enlarged plan view showing a part of the camera in which the operation dial 42 is installed.

As shown in these figures, three pawls 92A, 92B, and 92C are disposed with a predetermined spacing on the outer periphery of the wheel 54 so that the user's finger nail is placed on one of the pawls 92A, 92B, and 92C to rotate the wheel 54.

On the other hand, the side frame 64R, constituting the camera main body 12, is formed with an arc guide portion 94 along the outer peripheral shape of the wheel 54. A slit 94A is formed in the guide portion 94. The pawls 92A, 92B, and 92C, formed on the wheel 54, are arranged so as to protrude from the slit 94A.

Furthermore, the guide portion 94 has a stopper 96 formed slightly below its center so as to protrude from the guide portion 94. The stopper 96 is formed as a convex protruding portion extending orthogonally to the slit 94A. When the finger nail is placed on the pawl 92A or 92B to rotate the wheel 54, it abuts against the stopper 96 to enable the pawl 92A or 92B to be stopped at the position of the stopper.

Now, the movable cylinder 56 is assumed to lie in the collapsed position. At this time, the wheel 54 is in the "OFF position". Of the three pawls 92A, 92B, and 92C, only the first pawl 92A protrudes through the slit 94A in the guide portion 94.

In this state, the nail of the finger is placed on the first pawl 92A to rotate the wheel 54 in a direction A in FIG. 11. Then, once the wheel 54 is rotated by a predetermined amount, the nail of the finger is caught on the stopper 96 to stop the rotation of the wheel 54. At this time, the wheel 54 is placed in the "ON position", with the first pawl 92A placed at the same position as that of the stopper 96. Then, when the wheel 54 is rotated to the "ON position", the rotating action of the wheel 54 extends the movable cylinder 56 to the "shooting position". Specifically, when the wheel 54 is rotated from the "OFF position" to the "ON position", each of the end surface cams 68, formed on the wheel 54, moves from the base end portion of the first inclined surface 68A to the first flat surface 68C relative to the corresponding cam follower 82. As a result, the movable cylinder 56 is extended to the "shooting position".

When the wheel 54 is rotated from the "OFF position" to the "ON position", electric contacts (not shown) are closed to power on the camera.

Once the wheel 54 is placed in the "ON position" and the movable cylinder 56 is extended to the photographing position, the three pawls 92A, 92B, and 92C project through the slit 94A in the guide portion 94. In this state, when the user places his or her finger nail on the second pawl 92B to rotate the wheel 54 in the direction A in FIG. 11. Then, once the wheel 54 is rotated by a predetermined amount, the finger nail is caught on the stopper 96 to stop the rotation of the wheel 54. At this time, the wheel 54 is placed in the "macro position", with the second pawl 92B placed at the same position as that of the stopper 96.

Then, when the wheel 54 is rotated to the "macro position", the rotating action of the wheel 54 extends the movable cylinder 56 to the "macro shooting position". Specifically, when the wheel 54 is rotated from the "ON position" to the "macro position", each of the end surface cams 68, formed on the wheel 54, moves from the first flat surface 68C to the second flat surface 68F relative to the corresponding cam follower 82. As a result, the movable cylinder 56 is extended to the "macro photographing position".

In this manner, the first pawl 92A is provided at a position such that the wheel 54 is placed in the "ON position" (the movable cylinder 56 is placed in the "shooting position") when the first pawl 92A is rotated to the position of the stopper 96. The second pawl 92B is provided at a position such that the wheel 54 is placed in the "macro position" (the movable cylinder 56 is placed in the "macro shooting position") when the second pawl 92B is rotated to the position of the stopper 96. That is, the first and second pawls 92A and 92B are installed with a spacing between them which is equal to the step rotating angles required to place the wheel 54 in the "ON position" or the "macro position".

On the other hand, the third pawl 92C is installed so as to sit in the center of the guide portion 94 when the second pawl 92B is placed at the position of the stopper 96 (the wheel 54 is placed in the "macro position"). With the wheel 54 in the "macro position", when the user places his or her finger nail on the third pawl 92C to rotate the wheel 54 in the direction B in FIG. 11, each of the cam followers 82, formed on the movable cylinder 56, passes over the second protruding portion 68E. Then, when the cam follower 82 passes over the second protruding portion 68E, the urging force of the compression spring 86 withdraws the movable cylinder 56. Thus, the wheel 54 is placed in the "ON position" to contract the movable cylinder 56 into the "shooting position".

Likewise, with the wheel 54 in the "ON position", when the user places his or her finger nail on the second pawl 92B to rotate the wheel 54 in a direction B in FIG. 11, each of the cam followers 82, formed on the movable cylinder 56, passes over the first protruding portion 68B. Then, when the cam follower 82 passes over the first protruding portion 68B, the urging force of the compression spring 86 withdraws the movable cylinder 56. Thus, the wheel 54 is placed in the "OFF position" to collapse the movable cylinder 56 into the "collapsed position". The wheel 54 is placed in the "OFF position" to open the electric contacts (not shown). Thus, the camera is powered off.

In this manner, the wheel 54 can be rotatively moved between the "OFF position" and the "ON position" and the "macro position" by placing the finger nail on the three pawls 34A, 34B, and 34C, formed on the outer peripheral portion of the wheel 54 to rotate the wheel. Then, when the wheel 54 is placed in the "OFF position", the movable cylinder 56 holding the photographing lens 24 is collapsed into the "collapsed position". When the wheel 54 is placed in the "ON position", the movable cylinder 56 is extended to the "shooting position". When the wheel 54 is placed in the "macro position", the movable cylinder 56 is extended to the "macro shooting position".

As described above, the rotative movement of the wheel 54 is regulated by the strut 90. The range of the rotative movement is limited to the extent that the wheel 54 can rotatively move between the "OFF position" and the "macro position". This prevents the wheel 54 from rotating beyond the "OFF position" or "macro position".

While the wheel 54 is being rotated from the "OFF position" to the "ON position", each of the cam followers 82, provided on the movable cylinder 56, passes over the first protruding portion 68B, formed on the corresponding one of the end surface cams 68 of the wheel 54. When the cam follower 82 passes over the first protruding portion 68B, a shock is transmitted to the nail. The shock is felt as a click to allow the user to confirm that the wheel 54 has been placed in the "ON position".

Likewise, while the wheel 54 is being rotated from the "ON position" to the "macro position", each of the cam followers 82, provided on the movable cylinder 56, passes over the second protruding portion 68E, formed on the corresponding one of the end surface cams 68 of the wheel 54. When the cam follower 82 passes over the second protruding portion 68E, a shock is transmitted to the nail. The shock is felt as a click to allow the user to confirm that the wheel 54 has been placed in the "macro position".

Furthermore, the wheel 54 has "OFF", "ON", and "macro" marks 98A, 98B, and 98C provided on its back surface in association with the "OFF position", "ON position", and "macro position", respectively. When the wheel 54 is placed in the "OFF position", "ON position", or "macro position", the mark 98A, 98B, or 98C, respectively, is located under a window 100 formed in the side frame 64R. The user can check the display of the mark 98A, 98B, or 98C in the window 100 to determine the present state of the camera, that is, the OFF, ON, or macro state.

The digital camera 10 configured as previously described operates as described below.

When the wheel 54, constituting the operation dial 42, is placed in the "OFF position", the camera is powered off to place the movable cylinder 56 holding the photographing lens 24, in the "collapsed position".

On this occasion, one of the three pawls 92A, 92B, and 92C, formed on the wheel 54, that is, the first pawl 92A protrudes. When the finger nail is placed on the first pawl 92A to rotate the wheel 54, the stopper 96, formed on the guide portion 94, acts to stop and place the rotating wheel 54 in the "ON position". Once the wheel 54 is rotated from the "OFF position" to the "ON position", the movable cylinder 56 is extended from the "collapsed position" to the "shooting position". At the same time, the camera is powered on.

With the wheel 54 in the "ON position", when the finger nail is placed on the second pawl 92B, protruding through the guide portion 94, to rotate the wheel 54, the stopper 96, formed on the guide portion 94, acts to stop and place the rotating wheel 54 in the "macro position". Once the wheel 54 is placed in the "macro position", the movable cylinder 56 is extended to the "macro shooting position" to enables macro shooting.

On the other hand, with the wheel 54 in the "ON position", when the finger nail is placed on the second pawl 92B, protruding through the guide portion 94, to rotate the wheel 54 in the opposite direction, the compression springs 86 act to withdraw the movable cylinder 56 to the "collapsed position". At the same time, the camera is powered off.

Likewise, with the wheel 54 in the "macro position", when the finger nail is placed on the third pawl 92B, protruding through the guide portion 94, to rotate the wheel 54 in the opposite direction, the compression springs 86 act to withdraw the movable cylinder 56 to the "shooting position" to return the camera to normal shooting.

When the wheel 54 is placed in the "OFF position", "ON position", or "macro position", the mark 98A, 98B, or 98C of "OFF", "ON" and "macro", respectively, is located under the window 100, formed in the side frame 64R. Accordingly, the user can check the display of the mark 98A, 98B, or 98C in the window 100 to determine the present state of the camera, that is, the OFF, ON, or macro state.

Thus, according to the digital camera 10 of the present embodiment, the rotation of the operation dial 42 can be reliably stopped at the desired positions through the action of the pawls 92A, 92B, and 92C, provided on the operation dial 42, and of the stopper 96, provided on the camera main body 12.

The present embodiment has been described with reference to the example in which the present invention is applied to the operation dial 42, which is rotatively operated in two increments, for example, between the "OFF position" and the "ON position" and the "macro position". However, the present invention is also applicable to an operation dial rotatively operated in more increments. For example, the present invention is also applicable to an operation dial rotatively operated at a step rotating angle of 30° throughout its circumference. In this case, the pawls are installed on the outer peripheral portion of the operation dial at intervals of 30°.

Furthermore, the present embodiment has been described with reference to the example in which the present invention is applied to the operation dial rotatively operated through the different step rotating angles. However, the operation dial may be rotated through a fixed step rotating angle. Specifically, the present invention is also applicable to an operation dial operated through a fixed rotating angle from the OFF position" through the "ON position" to the "macro position", for example.

Moreover, the present embodiment has been described with reference to the example in which the present invention is applied to the operation dial of the digital camera. However, the application of the present invention is not limited to this aspect. The present invention is applicable to any electronic equipment and cameras comprising an operation dial rotatively operated through preset step rotating angles.

What is claimed is:

1. Electronic equipment comprising:

an electronic equipment main body; and an operation dial rotatably provided in said electronic equipment main body and rotatively operated through preset step rotating angles, said operation dial having a plurality of protruding portions which are formed on an outer peripheral portion at intervals equal to said step rotating angles and on which a finger nail is placed to rotate said operation dial, wherein said electronic equipment main body is formed with a rotation regulating portion against which, when the finger nail is placed on one of said protruding portions to rotate said operation dial through said corresponding step rotating angle, the finger nail placed on said protruding portion abuts at a predetermined position to regulate rotation of said operation dial.

2. The electronic equipment according to claim 1, wherein:

said electronic equipment main body is formed with an arc portion along an outer periphery of said operation dial, with a slit formed in said arc portion, only said protruding portions are protruded from said slit, and said rotation regulating portion is formed on said arc portion as a convex portion extending orthogonally to said slit.

3. The electronic equipment according to claim 1, wherein:

said electronic equipment main body has a window portion formed opposite an end surface of said operation dial, and the end surface of said operation dial is provided with indications of characters or pictographs for functions executed when the rotation of said operation dial is stopped, said indications being provided for said respective step rotating angles, so that when the rotation of said operation dial is stopped, one of said indications appears in said window portion.

4. The electronic equipment according to claim 2, wherein:

said electronic equipment main body has a window portion formed opposite an end surface of said operation dial, and the end surface of said operation dial is provided with indications of characters or pictographs for functions executed when the rotation of said operation dial is stopped, said indications being provided for said respective step rotating angles, so that when the rotation of said operation dial is stopped, one of said indications appears in said window portion.

5. A camera comprising:

a camera main body;

a lens barrel provided in said camera main body;

a driving member that is rotatively operated to drivingly extend said lens barrel; and an operation dial which rotatively operates said driving member and which is provided integrally with said driving member so as to be rotatable through preset step rotating angles with respect to said camera main body, said operation dial having a plurality of protruding portions which are formed on an outer peripheral portion of said operation dial at intervals equal to said step rotating angles and on which a finger nail is placed to rotate said operation dial, wherein said camera main body is formed with a rotation regulating portion against which, when said finger nail is placed on one of said protruding portion to rotate said operation dial through said corresponding step rotating angle, said finger nail placed on said protruding portion abuts at a predetermined position to regulate rotation of said operation dial, and said operation dial is rotated through one of said step rotating angles to rotatively operate said driving member to extend said lens barrel step by step in accordance with said step rotating angle.

6. The camera according to claim 5, wherein:

said camera main body is formed with an arc portion along an outer periphery of said operation dial, with a slit formed in said arc portion, only said protruding portions are protruded from said slit, and said rotation regulating portion is formed on said arc portion as a convex portion extending orthogonally to said slit.

7. The camera according to claim 5, wherein:

said camera main body has a window portion formed opposite an end surface of said operation dial, and the end surface of said operation dial is provided with indications of characters or pictographs for functions executed when the rotation of said operation dial is stopped, said indications being provided for said respective step rotating angles, so that when the rotation of said operation dial is stopped, one of said indications appears in said window portion.

8. The camera according to claim 6, wherein:

said camera main body has a window portion formed opposite an end surface of said operation dial, and the end surface of said operation dial is provided with indications of characters or pictographs for functions executed when the rotation of said operation dial is stopped, said indications being provided for said respective step rotating angles, so that when the rotation of said operation dial is stopped, one of said indications appears in said window portion.

* * * * *